United States Patent
Esteban et al.

(10) Patent No.: US 9,852,627 B2
(45) Date of Patent: Dec. 26, 2017

(54) PARKING MANAGEMENT SYSTEMS AND METHODS FOR INDICATING OCCUPIED AND UNOCCUPIED PARKING SPACES

(71) Applicant: The Boeing Company, Chicago, IL (US)

(72) Inventors: David Esteban, Chicago, IL (US); David Scarlatti, Chicago, IL (US); Enrique Casado, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/166,368

(22) Filed: May 27, 2016

(65) Prior Publication Data
US 2017/0345302 A1 Nov. 30, 2017

(51) Int. Cl.
*B60Q 1/48* (2006.01)
*G08G 1/14* (2006.01)
*G01V 8/00* (2006.01)

(52) U.S. Cl.
CPC .................. *G08G 1/14* (2013.01); *G01V 8/00* (2013.01); *G08G 1/142* (2013.01); *G08G 1/146* (2013.01)

(58) Field of Classification Search
CPC .......... G08G 1/14; G08G 1/142; G08G 1/146; G06Q 30/0284; G07B 15/04; G07F 17/246
USPC ...................................................... 340/932.2
See application file for complete search history.

(56) References Cited

U.S. PATENT DOCUMENTS

| | | | | |
|---|---|---|---|---|
| 5,432,508 A | * | 7/1995 | Jackson | G08G 1/146 340/932.2 |
| 6,229,455 B1 | * | 5/2001 | Yost | G07F 17/246 340/932.2 |
| 7,701,361 B2 | * | 4/2010 | Lee | G08G 1/14 340/932.2 |
| 8,692,688 B1 | * | 4/2014 | Tuxen | B60Q 9/002 340/425.5 |
| 8,723,689 B2 | * | 5/2014 | Mimeault | G08G 1/14 340/932.2 |
| 9,286,804 B2 | * | 3/2016 | Fayfield | G08G 1/142 |
| 2011/0099126 A1 | * | 4/2011 | Belani | G06Q 30/0284 705/418 |
| 2015/0339920 A1 | * | 11/2015 | Cortelyou | G08G 1/142 340/907 |

OTHER PUBLICATIONS

Agilsense: Vehicle Detector, http://www.agilsense.com/Vehicle-Detector/20/0/page_content.html, retrieved from the Internet on May 27, 2016.

(Continued)

*Primary Examiner* — John A Tweel, Jr.
(74) *Attorney, Agent, or Firm* — McDonnell Boehnen Hulbert & Berghoff LLP (57) ABSTRACT

A parking management system is described that includes a light detector, a reflector positioned within a parking space and aligned to direct received light to the light detector, and a processor receiving a signal from the light detector that indicates an amount of light detected by the light detector. The processor causes a parking space indicator to indicate that the parking space is unoccupied based on the amount of light detected by the light detector being greater than a threshold, and causes the parking space indicator to indicate that the parking space is occupied based on the amount of light detected by the light detector being less than the threshold.

20 Claims, 6 Drawing Sheets

(56) References Cited

OTHER PUBLICATIONS

Sensity, Lights. Sensors. Action. http://static1.squarespace.com/static/53d2cdffe4b069e965155fc8/t/5555060ee4b0c88ceaed0b88/1431635470526/20150421_Sensity_Corporate_Overview.pdf, Apr. 21, 2015.

* cited by examiner

┌─────────────────────────────────────────────────────────────────────────────────┐
│ RECEIVING A SIGNAL FROM A LIGHT DETECTOR ASSOCIATED WITH A PARKING SPACE, AND THE SIGNAL │ ─ 202
│ IS INDICATIVE OF AN AMOUNT OF LIGHT DETECTED BY THE LIGHT DETECTOR INCLUDING ANY LIGHT │
│ DIRECTED TO THE LIGHT DETECTOR BY A REFLECTOR POSITIONED WITHIN THE PARKING SPACE │
└─────────────────────────────────────────────────────────────────────────────────┘
                                        ▼
┌─────────────────────────────────────────────────────────────────────────────────┐
│ CAUSING A PARKING SPACE INDICATOR TO INDICATE THAT THE PARKING SPACE IS UNOCCUPIED BASED │ ─ 204
│ ON THE AMOUNT OF LIGHT DETECTED BY THE LIGHT DETECTOR BEING GREATER THAN A THRESHOLD │
└─────────────────────────────────────────────────────────────────────────────────┘
                                        ▼
┌─────────────────────────────────────────────────────────────────────────────────┐
│ CAUSING THE PARKING SPACE INDICATOR TO INDICATE THAT THE PARKING SPACE IS OCCUPIED BASED │ ─ 206
│ ON THE AMOUNT OF LIGHT DETECTED BY THE LIGHT DETECTOR BEING LESS THAN THE THRESHOLD │
└─────────────────────────────────────────────────────────────────────────────────┘

FIG. 9

▼
┌─────────────────────────────────────────────────────────────────────────────────┐
│ DETECTING THE LIGHT DIRECTED TO THE LIGHT DETECTOR BY THE REFLECTOR │ ─ 208
└─────────────────────────────────────────────────────────────────────────────────┘
                                        ▼
┌─────────────────────────────────────────────────────────────────────────────────┐
│ GENERATING THE SIGNAL BASED ON THE DETECTED LIGHT, AND AN AMOUNT OF POWER GENERATED IS │ ─ 210
│ BASED ON AN AMOUNT OF LIGHT DIRECTED BY THE REFLECTOR TO THE SOLAR LIGHT DETECTOR, │
│ WHICH IN TURN, IS BASED ON WHETHER THE PARKING SPACE IS OCCUPIED OR UNOCCUPIED │
└─────────────────────────────────────────────────────────────────────────────────┘

FIG. 10

PARKING MANAGEMENT SYSTEMS AND METHODS FOR INDICATING OCCUPIED AND UNOCCUPIED PARKING SPACES

FIELD

The present disclosure generally relates to parking management systems, and more particularly to, methods and systems to provide indications of occupied and unoccupied parking spaces.

BACKGROUND

Trying to find a parking space for an automobile can be frustrating at times, and can also spend time, cost money, and result in needless tailpipe emissions. Some parking lots include systems to inform drivers of open parking spaces.

Existing systems are typically deployed for indoor parking lots at airports and large shopping malls. An indoor infrastructure allows for placing infrared sensors as well as light indicators (red/green) on a ceiling, and required cabling for a resulting network and power source can be mounted to or in the infrastructure. Individual parking space occupancy is typically detected by battery operated sensors mounted on a ground surface and data is transmitted over a wireless network to a remote management controller to control the light indicator. These systems are unrealistic for outdoor parking lots as these systems require a network infrastructure for mounting, and such systems are also very costly.

What is needed is an efficient system for use in outdoor parking lots to alleviate a need to search for an open parking space, and reduce risk of injury associated with unnecessary vehicle traffic in parking lots.

SUMMARY

In one example, a parking management system is described that includes a light detector, a reflector positioned within a parking space and aligned to direct received light to the light detector, and a processor receiving a signal from the light detector. The signal is indicative of an amount of light detected by the light detector, and the processor causes a parking space indicator to indicate that the parking space is unoccupied based on the amount of light detected by the light detector being greater than a threshold and causes the parking space indicator to indicate that the parking space is occupied based on the amount of light detected by the light detector being less than the threshold.

In another example, a parking management system is described that includes a plurality of light detectors, and each light detector is associated with a respective parking space of a plurality of parking spaces. The parking management system also includes a plurality of reflectors, and each reflector is positioned within a respective parking space of the plurality of parking spaces and is aligned to direct received light to a respective light detector of the plurality of light detectors that is associated with the respective parking space. The parking management system also includes a plurality of processors, and each processor receives a signal from a respective light detector, and the signal is indicative of an amount of light detected by the respective light detector. Each processor causes a parking space indicator associated with a respective parking space to indicate that the respective parking space is unoccupied based on the amount of light detected by the respective light detector associated with the respective parking space being greater than a threshold, and causes the respective parking space indicator to indicate that the respective parking space is occupied based on the amount of light detected by the respective light detector associated with the respective parking space being less than the threshold.

In another example, a method is described that includes receiving a signal from a light detector associated with a parking space, and the signal is indicative of an amount of light detected by the light detector including any light directed to the light detector by a reflector positioned within the parking space. The method also includes causing a parking space indicator to indicate that the parking space is unoccupied based on the amount of light detected by the light detector being greater than a threshold, and causing the parking space indicator to indicate that the parking space is occupied based on the amount of light detected by the light detector being less than the threshold.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Parking lot occupancy detection and vehicle guidance systems for large outdoor automobile parking lots are described based on a reflective lighting system in support of environment, health and safety (EHS) initiatives. Examples described herein include methods for a low cost environmentally friendly solution to parking management systems in large outdoor facilities and factories by using reflective tape or light reflectors, for example, on parking spaces together with reflective light detector sensors to detect empty and occupied parking spaces and provide indications and guidance to drivers.

In one example, a parking management system is described that includes a light detector, a reflector positioned within a parking space and aligned to direct received light to the light detector, and a processor receiving a signal from the light detector that indicates an amount of light detected by the light detector. The processor causes a parking space indicator to indicate that the parking space is unoccupied based on the amount of light detected by the light detector being greater than a threshold, and causes the parking space indicator to indicate that the parking space is occupied based on the amount of light detected by the light detector being less than the threshold.

Example systems and methods described may solve problems with managing large outdoor parking lot guidance and occupancy. The systems are low cost, and require little to no infrastructure needed to deploy individual parking sensors in large outdoor parking spaces. The systems are also an environmentally friendly way of managing outdoor parking lots Referring now to FIG. 1, an example parking management system 100 is illustrated that includes a reflector 102 positioned within a parking space 104 and the reflector 102 is aligned to direct received light to a light detector 106. The system 100 also includes a processor 108 that receives a signal 110 from the light detector 106. The signal 110 indicates an amount of light detected by the light detector 106. The system also includes a parking space indicator 112, and the processor 108 causes the parking space indicator 112 to indicate that the parking space 104 is unoccupied based on the amount of light detected by the light detector 106 being greater than a threshold and cause the parking space indicator 112 to indicate that the parking space 104 is occupied based on the amount of light detected by the light detector 106 being less than the threshold.

Figure 1:
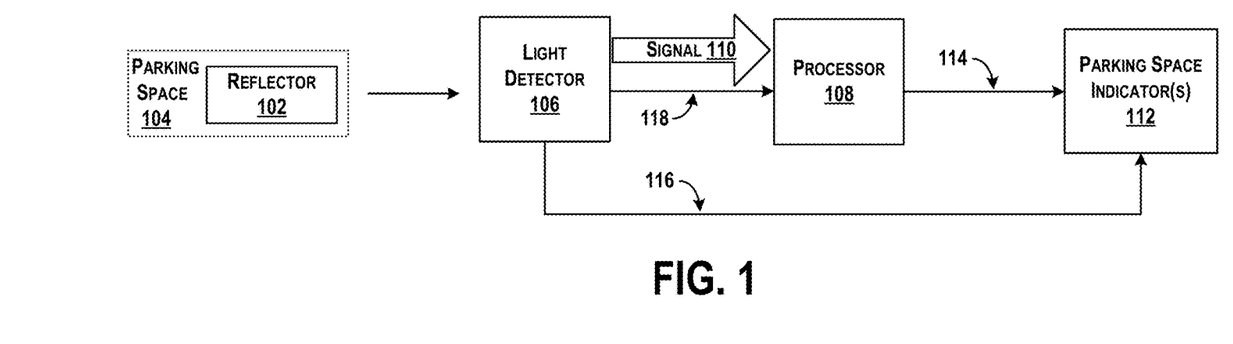
FIG. 1 illustrates an example parking management system that includes a reflector positioned within a parking space and the reflector is aligned to direct received light to a light detector, according to an example embodiment.

The reflector 102 may be or include any number or type of reflectors. In one example, the reflector 102 is a passive retroreflector. The reflector 102 can also include a corner cube retroreflector, or a reflective strip of material on the parking space 104. The reflector 102 is positioned on a surface of the parking space 104, and positioned or aligned to direct or redirect light to the light detector 106. The reflector 102 may also be embedded or partially embedded into the parking space 104, for example. The reflector 102 can also be glued to a surface of the parking space 104, or possibly painted on a surface of the parking space 104 in an example where the reflector 102 includes a reflective strip of material.

Figure 2:
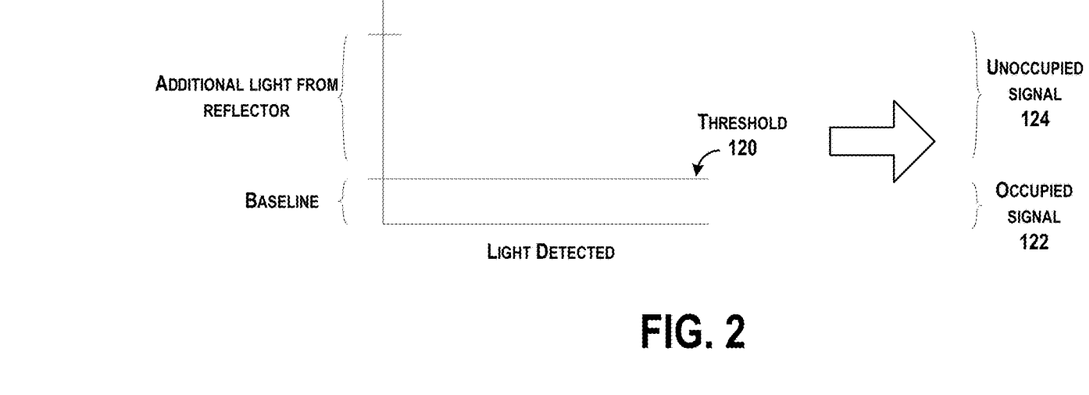
FIG. 2 illustrates an example graph showing an amount of light detected resulting in a signal generated, according to an example embodiment.

FIG. 2 illustrates an example graph showing an amount of light detected resulting in a signal generated. Because the reflector 102 is positioned on the parking space 104, if the parking space is occupied (e.g., by a vehicle), then the reflector 102 will be covered and unable to direct light to the light detector 106. Thus, the amount of light detected by the light detector 106 would be only a baseline amount of light received due to light directly received from the sun, and such a baseline amount is less than a threshold 120 set for indicating that the parking space is open. As a result, when the amount is less than the predetermined threshold 120, the parking space indicator 112 indicates that the parking space 104 is occupied due to information received from the processor 108 along communication line 114 (e.g., an occupied signal 122). Alternatively, if the parking space is unoccupied, the reflector 102 will not be covered and will be able to redirect any received sunlight to the light detector 106 causing the amount of light detected by the light detector 106 to be greater than the threshold 120. As such, the parking space indicator 112 indicates that the parking space 104 is unoccupied based on the amount of light detected by the light detector 106 being greater than the threshold 120 due to information received from the processor 108 along the communication line 114 (e.g., an unoccupied signal 124). The communication line 114 may be a wired or wireless communication line, and if wireless, the processor 108 and parking space indicator 112 may each have respective transceivers for wireless communication.

The threshold 120 can vary based on a time of day (e.g., baseline increases as sun is at a peak level), a geographic location of the system 100, a change in seasons, or even vary over the calendar year (e.g., such as due to changes in daylight savings time if the threshold 120 is coordinated to a time of day).

In some examples, the threshold 120 may be a distinct number or may be a range such that the system 100 allows for variances in an amount of light detected that can trigger the parking space indicator 112 to be on/off (e.g., indicating unoccupied or occupied). In such examples, when the amount of light detected by the light detector 106 is less than a lower number of a range of the threshold 120, the parking space indicator 112 indicates that the parking space 104 is occupied due to information received from the processor 108 along communication line 114 (e.g., an occupied signal 122). And, the parking space indicator 112 indicates that the parking space 104 is unoccupied based on the amount of light detected by the light detector 106 being greater than a higher number of a range of the threshold 120 due to information received from the processor 108 along the communication line 114 (e.g., an unoccupied signal 124). If the light detected is an amount within the range of the threshold 120, the processor 108 can be programmed to indicate that the parking space 104 is occupied, which may be a default indication when an amount of received light does not reach or surpass the threshold 120 or any range provided for the threshold 120.

Thus, within examples, when the parking space 104 is unoccupied, the reflector 102 directs a first amount of received light to the light detector 106 and when the parking space 104 is occupied the reflector 102 directs a second amount of received light to the light detector 106. The first amount of received light when the parking space 104 is unoccupied is greater than the second amount of received light when the parking space 104 is occupied.

The light detector 106 can be any number of detectors or sensors for detecting light, such as an infrared detector, a proximity detector, a photo sensor, or photodetector. In other examples, the light detector 106 is a solar light detector positioned proximal to the parking space 104.

In further examples, the light detector 106 includes solar panels to absorb the sun's rays as a source of energy for generating electricity or heating. The light detector 106 may include any number of solar cells and associated photovoltaic modules connected to constitute a solar array of a photovoltaic system that generates and supplies solar electricity. In such an example, the light detector 106 can be connected to the parking space indicator 112 through connection 116, and the light detector 106 generates power to operate the parking space indicator 112. Similarly, the light detector 106 can be connected to the processor 108 through connection 118, and the light detector 106 generates power to operate the processor 108.

Thus, within examples, the light detector 106 is a solar light detector to detect the light directed by the reflector 102 and to generate the signal 110 based on the detected light. The signal 110 can be a power signal, and an amount of power generated is based on an amount of light directed by the reflector 102 to the solar light detector, which in turn, is based on whether the parking space 104 is occupied or unoccupied. The light detector 106 may thus serve as both a source of energy to the system 100 and as a sensor to detect parking occupancy.

In examples in which the light detector 106 is a solar light detector that generates power, a change in generated power can be used as an indication of occupancy for the parking space 104. For example, if solar energy is being generated at a higher rate than baseline then the parking space 104 is available. On the contrary, if the parking space 104 is occupied, solar energy generated drops, and this change in energy generated can be used as a trigger to indicate that the parking space 104 is occupied.

The processor 108 can include a microprocessor or computer processor, as well as data storage (non-transitory computer readable medium) for storing instructions executable by the processor 108 for carrying out one or more functions for processing the signal 110 as well as causing the parking space indicator 112 to indicate that the parking space 104 is unoccupied based on the amount of light detected by the light detector 106 being greater than the threshold and cause the parking space indicator 112 to indicate that the parking space 104 is occupied based on the amount of light detected by the light detector 106 being less than the threshold.

The parking space indicator 112 can include one or more light sources that change color to indicate whether the parking space 104 is occupied or unoccupied. In other examples, the parking space indicator 112 can include a display screen or digital display to indicate whether the parking space 104 is occupied or unoccupied. Indicating that the parking space 104 is occupied or unoccupied includes indicating whether a vehicle is present in the parking space 104 or absent from the parking space 104. To put it another way, indicating that the parking space 104 is occupied or unoccupied includes indicating whether the parking space is taken or empty.

Figures 3, 4:
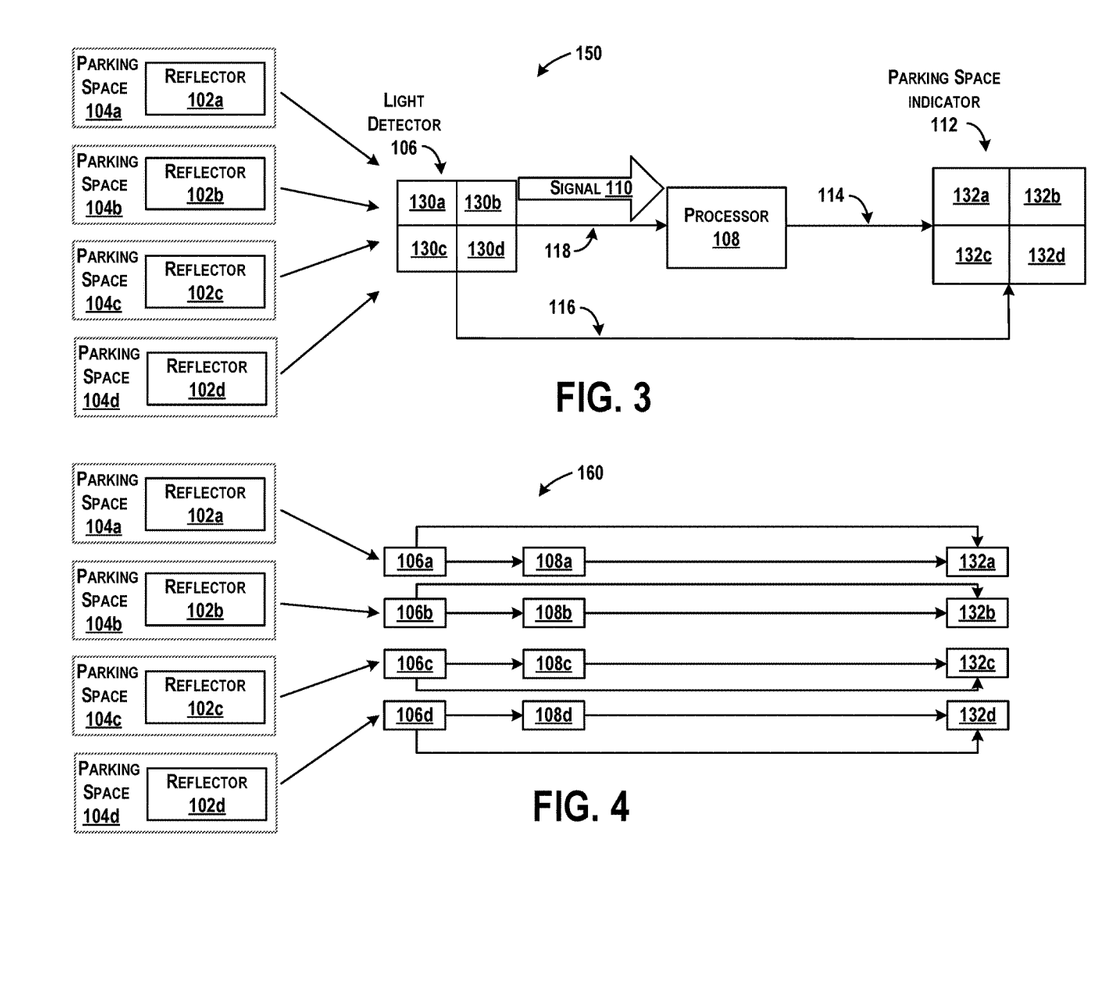
FIG. 3 illustrates an example parking management system that includes a plurality of reflectors respectively positioned within a plurality of parking spaces and aligned to direct received light to the light detector, according to an example embodiment.
FIG. 4 illustrates an example parking management system that includes a plurality of light detectors, and each light detector is associated with a respective parking space of the plurality of parking spaces, according to an example embodiment.

FIG. 3 illustrates an example parking management system 150 that includes a plurality of reflectors 102a-d respectively positioned within a plurality of parking spaces 104a-d and aligned to direct received light to the light detector 106. The light detector 106 has defined areas 130a-d for receiving light from respective reflectors of the plurality of reflectors 102a-d. The signal 110 output by the light detector 106 indicates the amount of light detected by the light detector 106 from each of the defined areas 130a-d. The processor 108 causes respective parking space indicators 132a-d corresponding to the plurality of parking spaces 104a-d to indicate that respective parking spaces are unoccupied based on the amount of light detected by the light detector 106 corresponding to areas of the defined areas 130a-d for receiving light from corresponding reflectors within the respective parking spaces 104a-d being greater than a threshold and causes the respective parking space indicators 132a-d to indicate that the respective parking spaces are occupied based on the amount of light detected by the light detector 106 corresponding to the areas of the defined areas 130a-d for receiving light from corresponding reflectors within the respective parking spaces 104a-d being less than the threshold.

Thus, in the example shown in FIG. 3, the processor 108 determines from the signal 110 which of the parking spaces 104a-d is occupied and/or unoccupied, and then causes a corresponding parking space indicator 132a-d to turn on or off to indicate occupied or unoccupied. The signal 110 may be a digital signal including data packets, and may include respective data packets per defined area 130a-d, and each data packet has an identifier indicating to which defined area 130a-d the data packet belongs. In another example, the light detector 106 outputs multiple signals, or one signal for each defined area 130a-d.

The light detector 106 in FIG. 3 is then responsible for reflector in multiple parking spaces, e.g., shown as being responsible for four parking spaces 104a-d. The light detector 106 can be responsible for more or fewer parking spaces as well depending on a size and configuration of the light detector 106.

The parking space indicator 112 is shown to include the multiple indicators 132a-d. Thus, the multiple indicators 132a-d may all be present on one frame, or the parking space indicator 112 may have areas defined for each respective indicator 132a-d, such as a display screen in which specific areas are designated for indications per parking spaces 104a-d.

FIG. 4 illustrates an example parking management system 160 that includes a plurality of light detectors 106a-d, and each light detector 106a-d is associated with a respective parking space of the plurality of parking spaces 104a-d. The system 160 also includes the plurality of reflectors 102a-d, and each reflector is positioned within a respective parking space of the plurality of parking spaces 104a-d and is aligned to direct received light to a respective light detector of the plurality of light detectors 106a-d that is associated with the respective parking space. The system 160 also includes a plurality of processors 108a-d, and each processor receives a signal from a respective light detector 106a-d indicative of an amount of light detected by the respective light detector 106a-d. Each processor 108a-d causes a parking space indicator 132a-d associated with a respective parking space 104a-d to indicate that the respective parking space 104a-d is unoccupied based on the amount of light detected by the respective light detector 106a-d associated with the respective parking space 104a-d being greater than a threshold and causes the respective parking space indicator 132a-d to indicate that the respective parking space 104a-d is occupied based on the amount of light detected by the respective light detector 106*a-d* associated with the respective parking space 104*a-d* being less than the threshold.

Thus, the system 160 includes multiple independent parking spaces monitors per parking space 104*a-d*. Each light detector 106*a-d* is shown connected to respective processors 108*a-d* to send a signal indicating light detected, as well as possibly for powering the processors 108*a-d* in an example in which the light detectors 106*a-d* are solar panels. Further, the light detectors 106*a-d* are each shown connected to respective parking space indicators 132*a-d* to power the parking space indicators 132 too.

The plurality of light detectors 106*a-d* may thus include solar light detectors, and each are positioned proximal to the respective parking spaces 104*a-d*, such as directly in front of the parking space or on a curb in front of the parking space.

In the example in which the plurality of light detectors 106*a-d* include solar light detectors to detect the light directed by the plurality of reflectors 102*a-d*, the light detectors 106*a-d* generate respective signals based on the detected light that are power signals. An amount of power generated is based on an amount of light directed by a respective reflector 102*a-d* to a respective solar light detector, which in turn, is based on whether the respective parking space 104*a-d* is occupied or unoccupied. When the parking space 104*a-d* is occupied, the reflector 102*a-d* is covered and will direct no light or less light to the light detector 106*a-d* as compared to when the parking space 104*a-d* is unoccupied.

Figure 5:
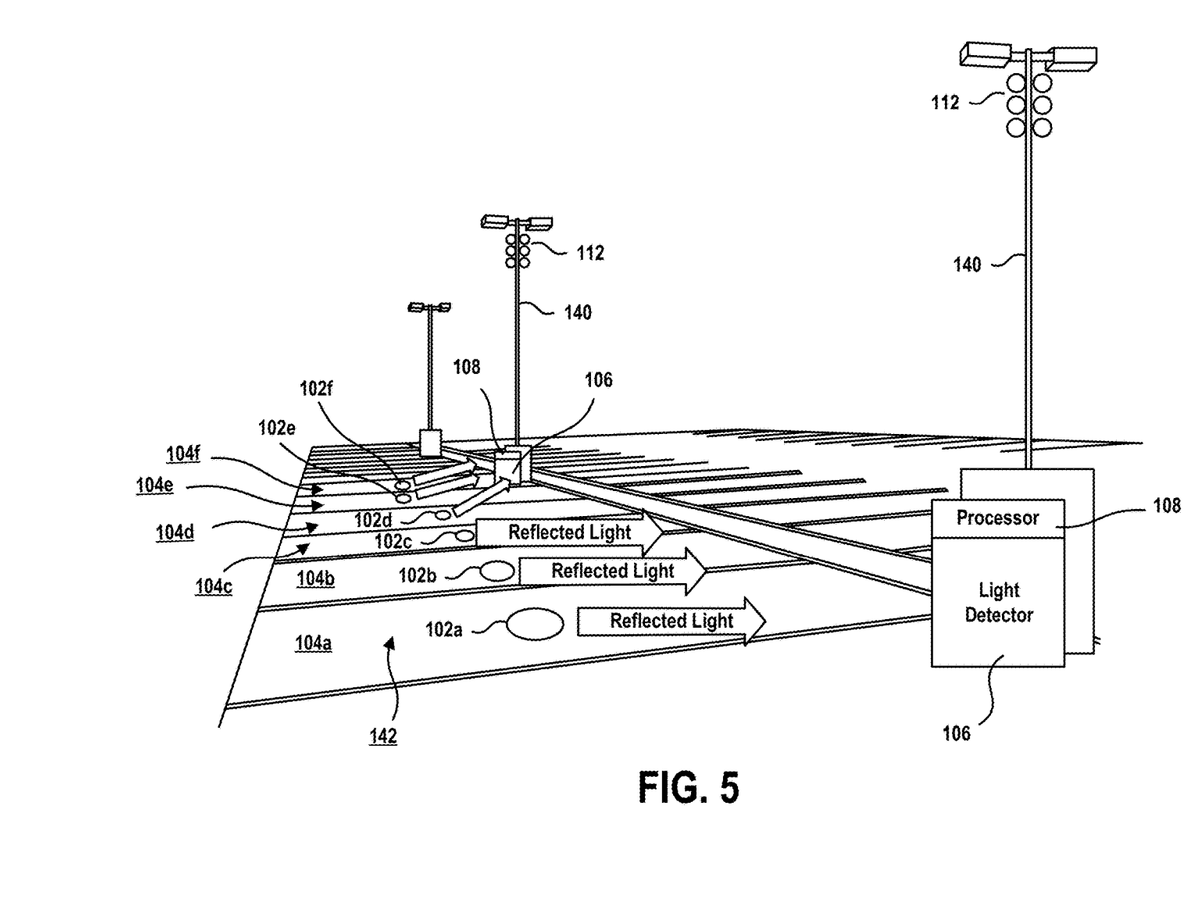
FIG. 5 illustrates an outdoor parking lot with multiple parking management systems in place, according to an example embodiment.

FIG. 5 illustrates an outdoor parking lot with multiple parking management systems 200 in place. A first parking management system 150 includes the reflectors 102*a-c* positioned within the parking spaces 104*a-c*, and each of the reflectors 102*a-c* is aligned to direct light to the light detector 106. The light detector 106 outputs a signal to the processor 108, which controls the parking space indicator 112 accordingly. The parking space indicator 112 is shown to be positioned on a light post 140, and the parking space indicator 112 has respective indicators that are each associated with one parking space 104*a-c*.

The outdoor parking lot in FIG. 5 also includes a second parking management system 150 including the reflectors 102*d-f* positioned within parking spaces 104*d-f*, and each of the reflectors 102*d-f* is aligned to direct light to another light detector 106.

In FIG. 5, the reflector 102*a* is shown positioned onto a surface 142 of the parking space 104*a*. As described above, the reflector 102 may also be embedded or partially embedded into the parking space 104*a*, glued to the surface 142 of the parking space 104, or possibly painted on the surface 142 of the parking space 104 in an example where the reflector 102 includes a reflective strip of material, for example.

The outdoor parking lot may include any number of the parking management system 150, the system 100 (shown in FIG. 1), or the system 160 (shown in FIG. 4), or any combination of these systems as well.

Figure 6:
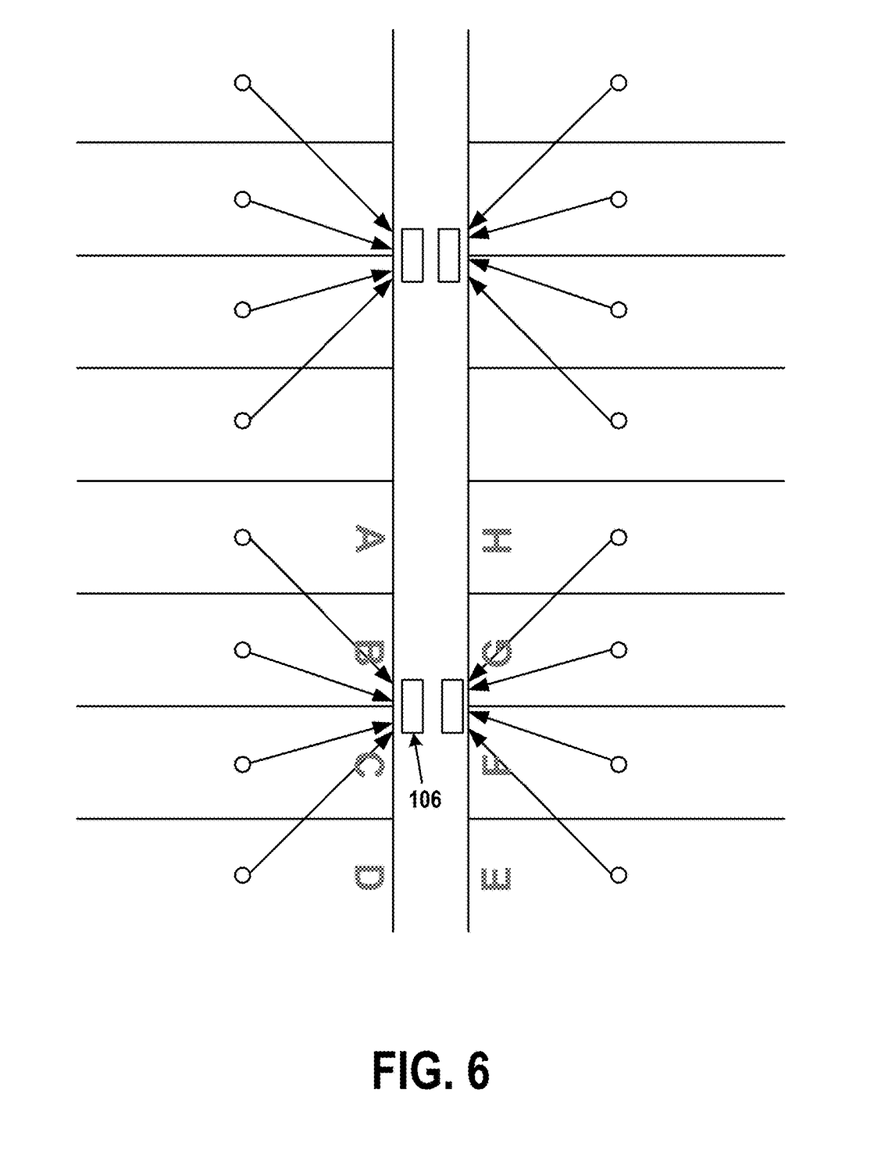
FIG. 6 illustrates a top view of an outdoor parking lot with multiple parking management systems in place, according to an example embodiment.

FIG. 6 illustrates a top view of an outdoor parking lot with multiple parking management systems in place. As shown, looking at the bottom left system, four parking spaces labeled A, B, C, and D each have corresponding reflectors directed to align light to the same light detector 106. More or fewer parking spaces may be associated with a single light detector. In some example, the light detector 106 may be double-sided and can accommodate parking spaces on either side so as to handle parking spaces labeled A, B, C, D, E, F, G, and H, for example, rather than two separate light detectors (as shown in FIG. 6).

Figure 7:
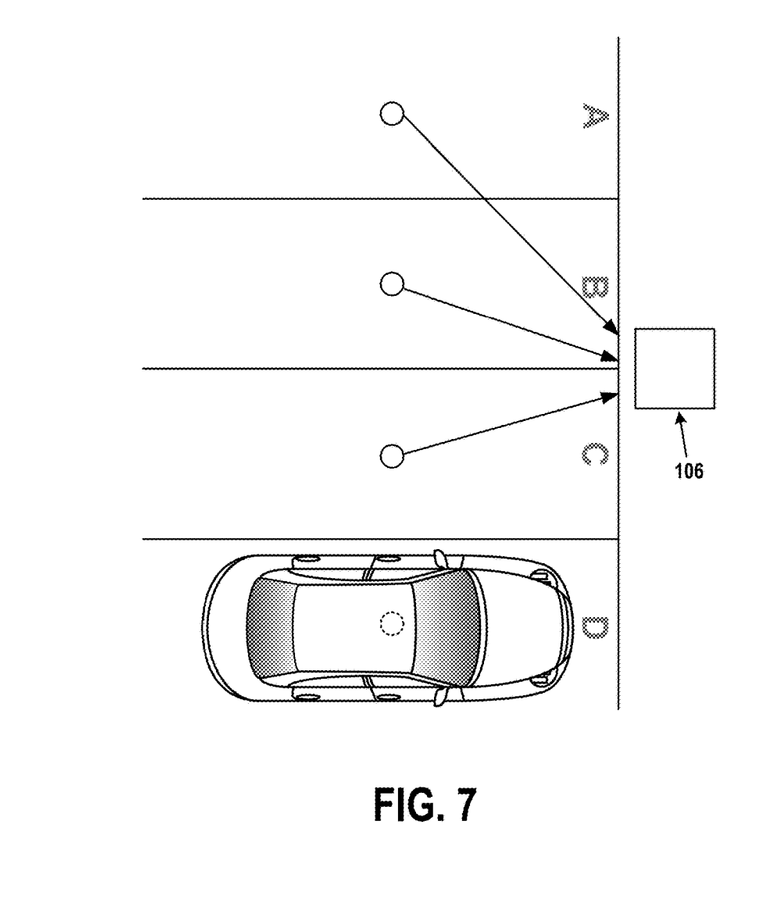
FIG. 7 illustrates a top view of an outdoor parking lot including parking spaces A, B, C, D that each have corresponding reflectors directed to align light to the same light detector, according to an example embodiment.

FIG. 7 illustrates a top view of an outdoor parking lot including parking spaces A, B, C, D that each have corresponding reflectors directed to align light to the same light detector 106. A car is parked in parking space D and so parking space D is occupied, and so no reflected light is received at the light detector from a corresponding reflector in parking space D. However, no cars are parked in any of parking spaces A, B, or C, and so parking spaces A, B, and C are unoccupied. Reflectors positioned in parking spaces A, B, and C will reflect light to the light detector 106.

Figure 8:
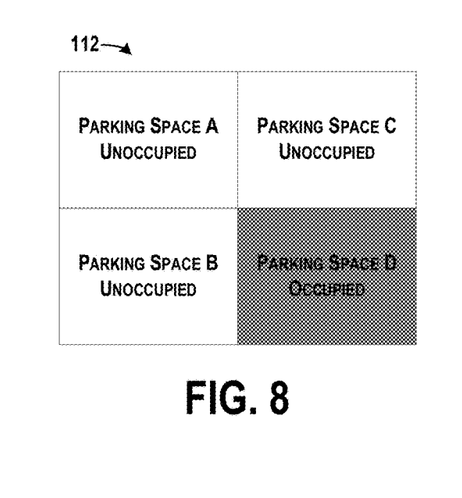
FIG. 8 illustrates an example parking indicator that indicates occupancy of parking spaces A, B, C, and D, according to an example embodiment.

FIG. 8 illustrates an example parking indicator 112 that indicates occupancy of parking spaces A, B, C, and D. As shown, the parking indicator 112 indicates that parking spaces A, B, and C are unoccupied through a color of a respective area of the parking indicator 112 designated for the respective parking space and/or via text that indicates an occupancy state. The parking indicator 112 also indicates that parking space D is occupied by the respective area be lighted and/or via text that indicates an occupancy state.

Figure 9:
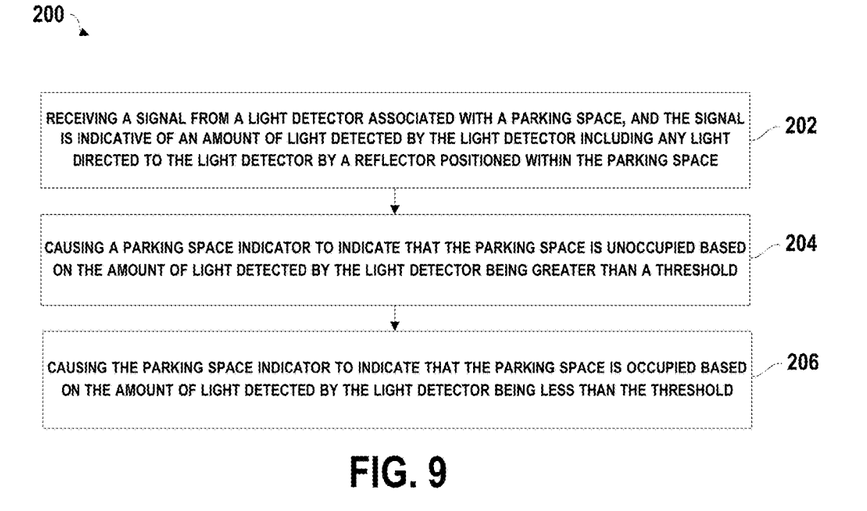
FIG. 9 shows a flowchart of an example method for indicating occupied and unoccupied parking spaces, according to an example embodiment.

FIG. 9 shows a flowchart of an example method 200 for indicating occupied and unoccupied parking spaces, according to an example embodiment. Method 200 shown in FIG. 9 presents an embodiment of a method that, for example, could be used with the system 100 shown in FIG. 1, system 150 shown in FIG. 3, and/or system 160 shown in FIG. 4, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving the signal 110 from the light detector 106 associated with the parking space 104, and the signal is indicative of an amount of light detected by the light detector 106 including any light directed to the light detector 106 by the reflector 102 positioned within the parking space 104.

At block 204, the method 200 includes causing the parking space indicator 112 to indicate that the parking space 104 is unoccupied based on the amount of light detected by the light detector 106 being greater than the threshold 120.

At block 206, the method 200 includes causing the parking space indicator 112 to indicate that the parking space 104 is occupied based on the amount of light detected by the light detector 106 being less than the threshold 120.

Figure 10:
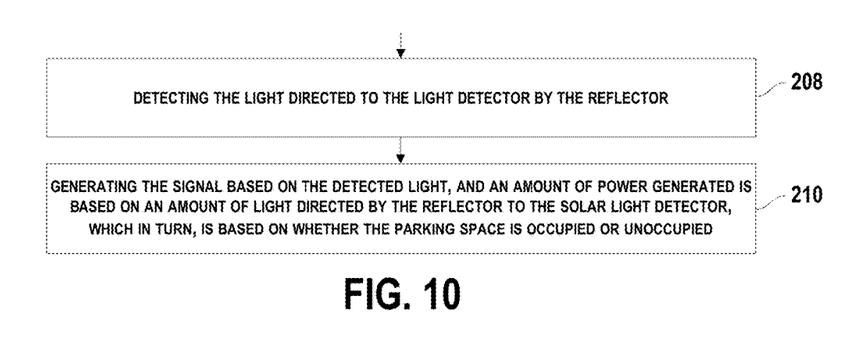
FIG. 10 shows a flowchart of an example method for use with the method in FIG. 9, according to an example embodiment.

FIG. 10 shows a flowchart of an example method for use with the method 200, according to an example embodiment. In examples where the light detector 106 is a solar light detector and the signal 110 is a power signal, functions can also include detecting the light directed to the light detector 106 by the reflector 102, as shown at block 208. In addition, functions can also include generating the signal 110 based on the detected light, and an amount of power generated is based on an amount of light directed by the reflector 102 to the solar light detector, which in turn, is based on whether the parking space 104 is occupied or unoccupied, as shown at block 210.

Example parking management systems described herein provide real-time parking availability.

Example parking management systems described herein can have an impact on environment, health and safety of drivers, and may also reduce stress and time caused trying to find an empty parking space in a parking lot. The example parking management systems have been described for use with outdoor parking lots. In some examples, the parking management systems can be used in indoor parking lots as well based on appropriate lighting provided above parking spaces. The parking management system is a low cost solution that has easy installation, and also when the light detectors are solar panels, the parking management system is a low energy consumption system that is environmentally friendly.

Example parking management systems are passive systems that redirect sunlight and do not require outside sources of electric power since the light detectors generate power for use. Because the reflectors require no energy, no electricity is spent on detecting presence or absence of cars in parking spaces with the exception of minimal amounts of energy to power the processor and the parking space indicators disposed on top of the light posts. As described, such minimal amounts of energy can be obtained through solar cells in the light detector, or possible received through a power connection to the light post itself.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A parking management system comprising:
   a light detector, wherein the light detector comprises a solar light detector;
   a reflector positioned within a parking space and aligned to direct received light to the light detector; and
   a processor receiving a signal from the light detector, the signal being indicative of an amount of light detected by the light detector, and the processor causing a parking space indicator to indicate that the parking space is unoccupied based on the amount of light detected by the light detector being greater than a threshold and causing the parking space indicator to indicate that the parking space is occupied based on the amount of light detected by the light detector being less than the threshold.

2. The parking management system of claim 1, wherein the solar light detector is positioned proximal to the parking space.

3. The parking management system of claim 1, wherein the light detector is connected to the parking space indicator, and wherein the light detector generates power to operate the parking space indicator.

4. The parking management system of claim 1, wherein the light detector is connected to the processor, and wherein the light detector generates power to operate the processor.

5. The parking management system of claim 1, wherein the light detector detects the light directed by the reflector and generates the signal based on the detected light.

6. The parking management system of claim 5, wherein the signal is a power signal, and wherein an amount of power generated is based on an amount of light directed by the reflector to the solar light detector, which in turn, is based on whether the parking space is occupied or unoccupied.

7. The parking management system of claim 1, wherein when the parking space is unoccupied the reflector directs a first amount of received light to the light detector and when the parking space is occupied the reflector directs a second amount of received light to the light detector, wherein the first amount of received light is greater than the second amount of received light.

8. The parking management system of claim 1, wherein the reflector is a passive retroreflector.

9. The parking management system of claim 1, wherein the reflector is positioned on a surface of the parking space.

10. The parking management system of claim 1, wherein the reflector includes a corner cube retroreflector.

11. The parking management system of claim 1, wherein the reflector includes a reflective strip of material on the parking space.

12. The parking management system of claim 1, further comprising the parking space indicator, wherein the parking space indicator comprises a light source that changes color to indicate whether the parking space is occupied or unoccupied.

13. The parking management system of claim 12, wherein the parking space indicator is positioned on a light post.

14. The parking management system of claim 1, further comprising:
   a plurality of reflectors respectively positioned within a plurality of parking spaces and aligned to direct received light to the light detector, wherein the light detector has defined areas for receiving light from the plurality of reflectors; and
   wherein the signal output by the light detector indicates the amount of light detected by the light detector from each of the defined areas, and
   wherein the processor causes respective parking space indicators corresponding to the plurality of parking spaces to indicate that respective parking spaces are unoccupied based on the amount of light detected by the light detector corresponding to areas of the defined areas for receiving light from corresponding reflectors within the respective parking spaces being greater than a threshold and causes the respective parking space indicators to indicate that the respective parking spaces are occupied based on the amount of light detected by the light detector corresponding to the areas of the defined areas for receiving light from corresponding reflectors within the respective parking spaces being less than the threshold.

15. The parking management system of claim 14, further comprising:
   the parking space indicators positioned on a light post, wherein each parking space indicator is associated with one parking space.

16. A parking management system comprising:
   a plurality of light detectors, and each light detector being associated with a respective parking space of a plurality of parking spaces, wherein the plurality of light detectors comprise solar light detectors;
   a plurality of reflectors, and each reflector positioned within a respective parking space of the plurality of parking spaces and aligned to direct received light to a respective light detector of the plurality of light detectors that is associated with the respective parking space; and
   a plurality of processors, and each processor receiving a signal from a respective light detector, the signal being indicative of an amount of light detected by the respective light detector, and each processor causing a parking space indicator associated with a respective parking space to indicate that the respective parking space is unoccupied based on the amount of light detected by the respective light detector associated with the respective parking space being greater than a threshold and causing the respective parking space indicator to indicate that the respective parking space is occupied based on the amount of light detected by the respective light detector associated with the respective parking space being less than the threshold.

17. The parking management system of claim 16, wherein the solar light detectors are positioned proximal to respective parking spaces of the plurality of parking spaces.

18. The parking management system of claim 16, wherein the solar light detectors detect the light directed by the plurality of reflectors and generate respective signals based on the detected light,
wherein the respective signals are power signals, and wherein an amount of power generated is based on an amount of light directed by a respective reflector to a respective solar light detector, which in turn, is based on whether the respective parking space is occupied or unoccupied.

19. A method comprising:
receiving a signal from a light detector associated with a parking space, the signal being indicative of an amount of light detected by the light detector including any light directed to the light detector by a reflector positioned within the parking space, wherein the light detector comprises a solar light detector;
causing a parking space indicator to indicate that the parking space is unoccupied based on the amount of light detected by the light detector being greater than a threshold; and
causing the parking space indicator to indicate that the parking space is occupied based on the amount of light detected by the light detector being less than the threshold.

20. The method of claim 19, wherein the signal is a power signal, and the method further comprises:
detecting the light directed to the light detector by the reflector; and
generating the signal based on the detected light, wherein an amount of power generated is based on an amount of light directed by the reflector to the solar light detector, which in turn, is based on whether the parking space is occupied or unoccupied.

* * * * *